April 22, 1941.                H. P. MEE                2,239,332
           REMOVABLE IMPLEMENT CARRYING TRACTOR FRAME
                        Filed June 13, 1940

INVENTOR
*Herbert P. Mee*
BY *George Douglas Jones*
ATTORNEY

Patented Apr. 22, 1941

2,239,332

UNITED STATES PATENT OFFICE 2,239,332

REMOVABLE IMPLEMENT CARRYING TRACTOR FRAME

Herbert P. Mee, Cleveland, Ohio, assignor to The Cleveland Tractor Company, Cleveland, Ohio Application June 13, 1940, Serial No. 340,375

3 Claims. (Cl. 97—47)

This invention relates to a removable implement carrying frame for tractors, and more especially to means for the quick attaching and detaching of various types of implements to a tractor.

The principal object of the invention is to provide in a tractor having spaced apart parallel main frames, a removable implement carrying member whereby implements of different designs and for different purposes may be easily attached or detached therefrom.

Another object of the present invention is to provide an elongated implement carrying member secured to the main frame of a tractor with spaced apart L shaped slots in the upper portion of the member to more easily connect or disconnect supporting means for implements.

The attainment of the above objects, which will be apparent from the detailed description to follow, is of great assistance to the designer of implements and also to the user of these implements. He is thus able to quickly attach to any tractor having sides frames these elongated implement carrying members which are mounted to the tractor main frame and in parallel spaced relation thereto.

Further and other objects of the present invention will be hereinafter set forth in the accompanying specification and claims and shown in the drawing, which shows by way of illustration a preferred embodiment and the principle thereof, and what I now consider to be the best mode in which I have contemplated applying that principle. Other embodiments of the invention employing the same or equivalent principle may be used and structural changes made as desired by those skilled in the art without departing from the present invention and within the spirit of the appended claims.

In the drawing

Figure 1:
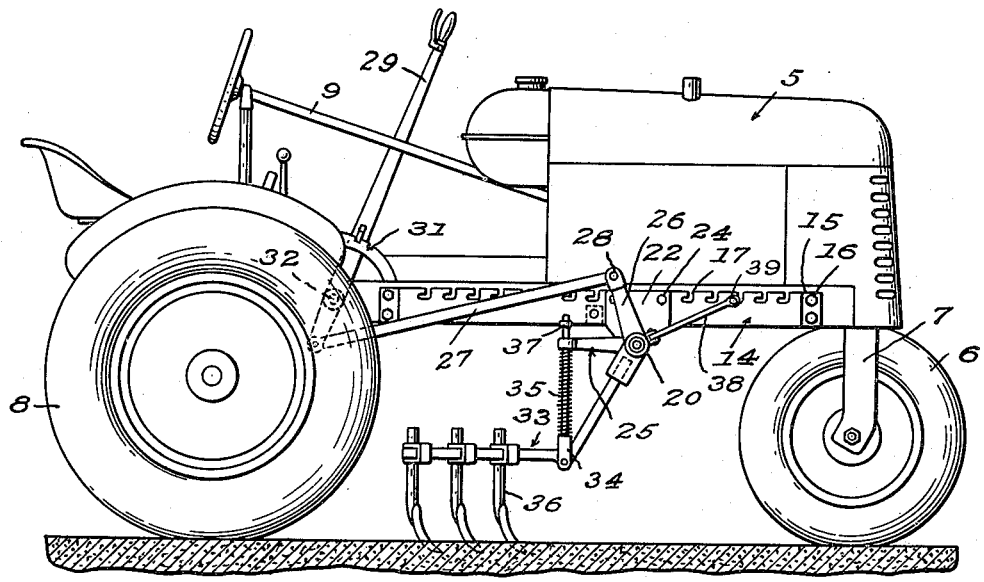
Figure 1 is a side elevational view of a tractor embodying the invention.
Figures 2, 3:
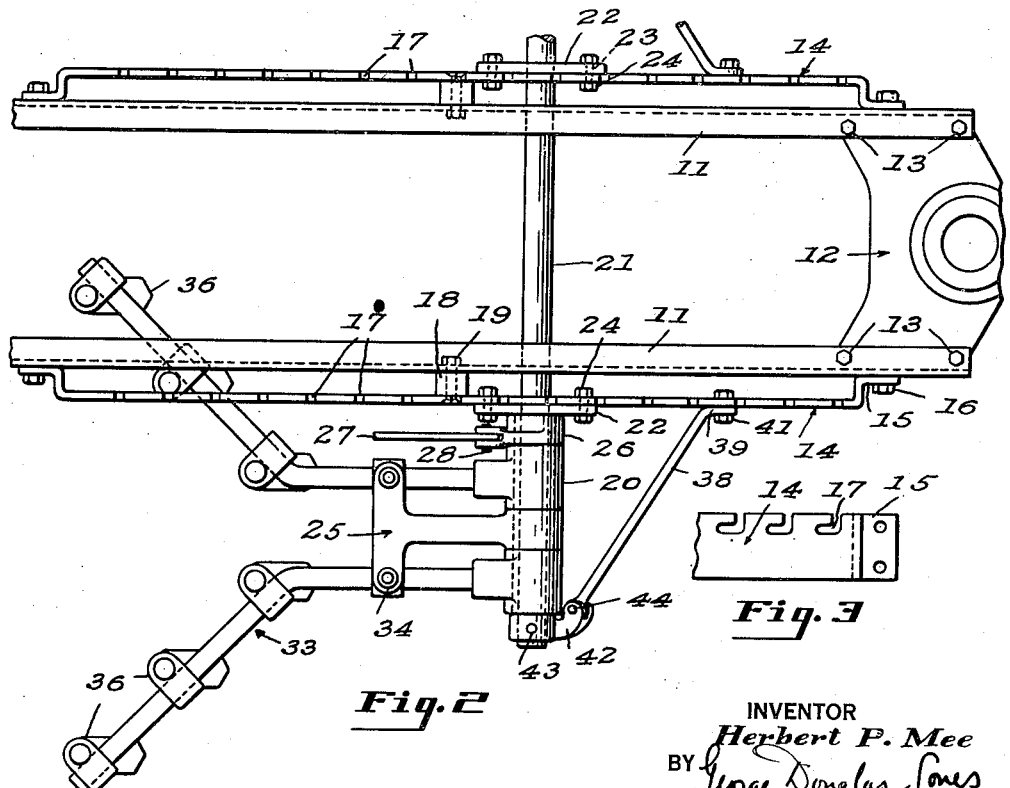
Figure 2 is a top plan view showing the side frames of a conventional tractor and the removable frame of this invention secured thereto.
Figure 3 is a fragmental portion of the implement carrying member of the front end of the invention.

Referring now to the drawing by numerals and reference wherein like numerals correspond to like parts, numeral 5 indicates a conventional tractor having a front dirigible wheel 6, supported by steering spindle and fork 7 rear driving wheels 8, a steering member 9 associated with the front dirigible means, and a main frame 11 comprising two parallel spaced apart members joined at their forward ends by a dirigible support gusset 12, which is secured to the frame 11 by means of bolts 13. At the rear the transmission housing (not shown) connects the members of the main frame 11.

Removably associated with each of the side members of frame 11 is an implement carrying member 14, having L shaped inturned ends 15 which are secured to the main frame of the tractor by any suitable means such as bolts 16. Each carrying member 14 is provided at the upper edge thereof with downwardly extending, spaced apart, L shaped slots 17, preferably extending with regular spacing along the entire length of the said members. A spacer 18 may be provided midway between the ends of each supporting member 14 and secured to the parallel supporting member and the main frame 11 by means of bolts 19. As shown, the upper side or edge of each implement carrying member 14 is disposed below the upper plane of the side frame members of the tractor main frame 11.

In order to more clearly illustrate the use of my invention I have shown a conventional cultivator supported by the said invention. The cultivator includes a sleeve assembly 20 and a drawbar 21 which extends under the main frame and projects on either side thereof, and has journaled thereto spaced apart plates or supports 22 having holes 23 therein, in which are placed bolts 24. These bolts 24 drop into an adjacent pair of the slots 17 and are pulled rearwardly, and the nuts of the bolts are tightened, thereby rigidly securing the cultivator or other implement to the tractor.

The purpose of the rearwardly turned L shaped slot 17 is to provide a self-locking slot which prevents the implement from kicking up and pushing bolts 24 out of the slots when striking an obstruction.

The sleeve assembly 20 is carried by the drawbar 21 to which is secured gang lifting T shaped arm 25, and lifting lever arm 26. The lifting rod 27 is pivotally connected to the arm 26 by means of pin 28, and is pivotally secured at its rearward end to hand lift lever 29 which is provided with ratchet means 31 and rockably mounted on the main frame 11 by securing means 32. A conventional gang 33 is associated in swivel fashion with the sleeve 20 of the drawbar 21 and is carried by the lifting rods 34 which are provided with compressible springs 35 which tend to force the ground working tools 36 into the ground. A collar 37 is arranged to abut the upper side of lifting member 25 in order that the entire ground working mechanism can be raised free of the soil when turning or transporting the unit.

A reinforcing rod 38 may be used to take strain away from the end of the drawbar 21. The rod 38 has an L shaped forward portion 39 having an aperture therein and is secured to the implement supporting member by a bolt 41.

Yoke 42 is secured to the outer end of the drawbar 21 by means of a pin 43. The reinforcing rod 38 is pivotally secured to the yoke 42 by means of pin 44.

It will be seen from the above detailed description that the invention comprises an inexpensive, simple and most efficient means of attaching and detaching various and sundry types of implements. It eliminates the necessity of drilling holes in the main frames, thereby weakening the same, and provides any tractor of the conventional type with implement attaching means, at the same time permitting the user to adapt old implements or new to the tractor at very little cost.

While I have herein described in some detail the specific embodiment of my invention which I deem to be new and advantageous and may specifically claim, I do not desire it to be understood that my invention is limited to the exact details of construction, as it will be apparent that changes may be made therein without departing from the spirit or scope of my invention.

What I claim is:

1. In combination, a tractor main frame including side frame members, and an elongated implement carrying member extending along the outer side of one of the side frame members of the tractor main frame, said implement carrying member being substantially spaced throughout most of its length from the main frame and being formed with inwardly turned end portions secured to said main frame, and said implement carrying member having a plurality of regularly spaced L-shaped notches extending inwardly from its upper side with the horizontal legs of the notches turned toward the rear of the main frame, the upper side of the implement carrying member being disposed below the upper plane of the side frame members of the main frame.

2. In combination, a tractor main frame including side frame members, and an elongated implement carrying member extending along the outer side of each of the side frame members of the tractor main frame and parallel thereto, said implement carrying members being substantially spaced throughout most of their lengths from the respective side frame members and being formed with inwardly turned end portions secured thereto, and said implement carrying members each having a plurality of regularly spaced L-shaped notches extending inwardly from its upper side with the horizontal legs of the notches turned toward the rear of the main frame, the upper side of each implement carrying member being disposed below the upper plane of the side frame members of the main frame.

3. In combination, a tractor main frame, an elongated implement carrying member extending along the outer side of the tractor main frame, said implement carrying member being spaced throughout most of its length from the main frame and being formed with inwardly turned end portions secured to said implement carrying member having a plurality of regularly spaced L-shaped notches extending inwardly from its upper side with the horizontal legs of the notches turned toward the rear of the main frame, a support member provided with a journal opening for an implement supporting shaft and a pair of holes spaced to correspond to the distance between two of the notches in the implement carrying member, and a pair of bolts passing through the respective holes of the support member and the notches of the implement carrying member.

HERBERT P. MEE.